(12) United States Patent
Kshirsagar

(10) Patent No.: US 10,353,809 B2
(45) Date of Patent: Jul. 16, 2019

(54) SYSTEM AND METHOD FOR EXECUTING INTEGRATION TESTS IN MULTIUSER ENVIRONMENT

(71) Applicant: Tata Consultancy Services Limited, Mumbai (IN)

(72) Inventor: Mahesh M. Kshirsagar, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 73 days.

(21) Appl. No.: 14/955,813

(22) Filed: Dec. 1, 2015

(65) Prior Publication Data

US 2017/0153969 A1 Jun. 1, 2017

(51) Int. Cl.
*G06F 9/44* (2018.01)
*G06F 11/00* (2006.01)
(Continued)

(52) U.S. Cl.
CPC ...... *G06F 11/3688* (2013.01); *G06F 11/3414* (2013.01); *G06F 11/3664* (2013.01);
(Continued)

(58) Field of Classification Search
CPC .. G06F 7/78; G06F 8/00–78; G06F 9/44–455; G06F 11/36; G06F 11/31907;
(Continued)

(56) References Cited

U.S. PATENT DOCUMENTS 6,002,871 A    12/1999   Duggan et al.
6,601,020 B1 *   7/2003   Myers ................ G06F 11/3414
                                                                           455/67.14
(Continued)

OTHER PUBLICATIONS

Mathias Bauer et al., Hardware/Software Co-Simulation in a VHDL-based Test Bench Approach, Jun. 9-13, 1997, [Retrieved on Apr. 26, 2019]. Retrieved from the internet: 6 Pages (774-779) (Year: 1997).*

(Continued)

*Primary Examiner* — Anibal Rivera
(74) *Attorney, Agent, or Firm* — Finnegan, Henderson, Farabow, Garrett & Dunner LLP

(57) ABSTRACT

System and method for executing integration tests for testing software code are disclosed. The system comprises multi-user integrated test framework to simulate a multi-user test environment for executing integration tests concurrently. Multi-user integrated test framework receives 'N' as number of concurrent users for integration test project comprising integration tests associated with software code. The multi-user integrated test framework simulates multi-user test environment comprising locating a target assembly associated with the integration test project and generating executing assembly by using the integration tests from the target assembly. Simulating the multi-user test environment further comprises dissociating target assembly from executing assembly such that target assembly is prevented from locking and concurrently executing the integration tests, N number of times, by using executing assembly and parallel task library to obtain outcome of each of the plurality of the integration tests.

9 Claims, 3 Drawing Sheets

(51) Int. Cl.
*G06F 17/00* (2019.01)
*G06F 11/36* (2006.01)
*G06F 11/34* (2006.01)
*G06F 11/263* (2006.01)
*G06F 11/26* (2006.01)

(52) U.S. Cl.
CPC ............ *G06F 11/26* (2013.01); *G06F 11/263* (2013.01); *G06F 11/3409* (2013.01); *G06F 11/3419* (2013.01)

(58) Field of Classification Search
CPC ............ G06F 11/3688; G06F 11/3414; G06F 11/3664; G06F 11/3419; G06F 11/3409; G06F 11/26; G06F 11/263; G06F 8/20
See application file for complete search history.

(56) References Cited

U.S. PATENT DOCUMENTS

| | | | | |
|---|---|---|---|---|
| 6,775,824 | B1* | 8/2004 | Osborne, II | G06F 11/3664 714/46 |
| 6,934,934 | B1* | 8/2005 | Osborne, II | G06F 11/3414 709/224 |
| 7,000,224 | B1* | 2/2006 | Osborne, II | G06F 11/3688 714/738 |
| 7,194,535 | B2* | 3/2007 | Hannel | H04L 29/06 703/13 |
| 7,793,263 | B2 | 9/2010 | Farchi et al. | |
| 8,954,409 | B1* | 2/2015 | Kerem | G06F 16/9014 707/704 |
| 9,135,714 | B1* | 9/2015 | Gauf | G06T 7/0085 |
| 2006/0288256 | A1* | 12/2006 | Mathew | G06F 11/3409 714/38.14 |
| 2009/0089320 | A1 | 4/2009 | Tendler et al. | |
| 2010/0333072 | A1* | 12/2010 | Dulip | G06F 11/3419 717/128 |
| 2011/0099424 | A1* | 4/2011 | Rivera Trevino | G06F 11/263 714/25 |
| 2011/0225566 | A1* | 9/2011 | Muharsky | G06F 11/3664 717/124 |
| 2011/0275170 | A1* | 11/2011 | Van Wagenen | G01R 31/31907 438/14 |
| 2013/0054792 | A1* | 2/2013 | Sharaf | G06F 8/20 709/224 |
| 2013/0102091 | A1* | 4/2013 | King | H01L 22/20 438/5 |
| 2013/0139130 | A1* | 5/2013 | Anjan | G06F 11/3672 717/131 |
| 2013/0179144 | A1 | 7/2013 | Lu et al. | |
| 2013/0305030 | A1 | 11/2013 | Chen et al. | |
| 2014/0237291 | A1* | 8/2014 | Elston | G06F 11/26 714/25 |

OTHER PUBLICATIONS

V.S. Sunderam et al., EcliPSe: A System for High Performance Concurrent Simulation, Nov. 1991, [Retrieved on Apr. 26, 2019]. Retrieved from the internet: 31 Pages (1190-1219) (Year: 1991).*

* cited by examiner

SYSTEM AND METHOD FOR EXECUTING INTEGRATION TESTS IN MULTIUSER ENVIRONMENT

TECHNICAL FIELD

This disclosure relates generally to software testing, and more particularly to system and method for executing integration tests in a multi-user environment.

BACKGROUND

Background on Conventional Systems

The inventors here have recognized several technical problems with conventional systems, as explained below. Currently integration test cases written by software developers are executed in a single-user environment. These test cases can't be useful in capturing behavior of the software code in a multi-user environment. For example, generally performance tests or stress tests are performed after development of the software code is complete. As a part of development, a developer writes unit and integration test cases, and executes these test cases to test the software code. These test cases, particularly the integration test cases are executed sequentially. While sequential execution of the integration test cases, the test scenarios listed below never get tested because of the sequential execution of the test cases.

One of the test scenario is a general performance test scenario under expected load. Developers never get an idea about the performance of the software code until the software code is executed in a multi-user environment. Further, the time for performing performance test of the software code at the end of development cycle is too late and inappropriate because at that time business is eagerly expecting release of the software. It is hard to replicate stress test scenario using a log file produced in performance test. It is difficult for a developer to simulate exact test scenario by just using log file.

Another issue is database locking and deadlock issues. A scenario wherein two methods are trying to access same database resource is never orchestrated using sequential execution of the integration tests. Behavior of Static class usages is not tested in sequential execution of integration test cases. Since only one pass of integration tests is executed, behavior of static class/methods (extension methods) in a concurrent/multi-user environment is never tested. Database connection pooling issues: Sequential execution of integration test cases can't test scenarios where connection pool exceeds allowed limit.

Further, a prior art solution available In Visual Studio is a Nunit Test Explorer. The Nunit Test Explorer selects one or multiple tests at a time, and then executes the multiple tests in sequential way (i.e. run the tests run one after another). Integration tests verify a single unit of execution. Purpose of the integration tests is to assert that functionality is working as expected. However, this assertion is based on the assumption that a single user (or execution) works for all users (or executions). This assumption overlooks the facts that dynamics of multi-user environments are different. However, a single user (or execution) can not necessarily work for all the users executing concurrently.

SUMMARY

Embodiments of the present disclosure present technological improvements as solutions to one or more of the above-mentioned technical problems recognized by the inventors in conventional systems. For example, in one embodiment, a method for executing a plurality of integration tests for testing software code is described. The method comprises receiving, by a processor 202, 'N' as a number of concurrent users for an integration test project. The integration test project comprises a plurality of integration tests associated with software code. The method further comprises simulating a multi-user test environment. Simulating the multi-user test environment further comprises locating, by the processor 202, a target assembly associated with the integration test project and generating, by the processor 202, an executing assembly by using the plurality of integration tests from the target assembly. Simulating the multi-user test environment further comprises dissociating, by the processor 202, the target assembly from the executing assembly such that the target assembly is prevented from locking. Simulating the multi-user test environment further comprises concurrently executing, by the processor 202, the plurality of integration tests, N number of times, in the simulated multi-user test environment, by using the executing assembly and a parallel task library, to obtain an outcome of each of the plurality of the integration tests. The multi-user test environment facilitates concurrent execution of stress tests for multiple concurrent users for the software code in an integrated development environment during development stage of the software code.

In another embodiment, a system 102 for executing a plurality of integration tests for testing software code is described. The system 102 comprise a processor 202 and a memory 206 coupled to the processor 202. The processor 202 executes a multi-user integrated test framework 214 stored in the memory 206 to simulate a multi-user test environment for executing a plurality of integration tests concurrently. The multi-user integrated test framework 214 comprises a plurality of modules 208. The plurality of modules 208 comprises a data receiving module 210 and a task execution module 212. The data receiving module 210 receives 'N' as a number of concurrent users for an integration test project. The integration test project comprises the plurality of integration tests associated with software code. The task execution module 212 simulates the multi-user test environment. Simulating the multi-user test environment comprises locating a target assembly associated with the integration test project and generating an executing assembly by using the plurality of integration tests from the target assembly. Simulating the multi-user test environment further comprises dissociating the target assembly from the executing assembly such that the target assembly is prevented from locking. Simulating the multi-user test environment further comprises concurrently executing the plurality of integration tests, N number of times, by using the executing assembly and a parallel task library, to obtain an outcome of each of the plurality of the integration tests.

In yet another embodiment, a non-transitory computer readable medium embodying a program executable in a computing device for executing a plurality of integration tests for testing software code is described. The program comprises a program code for receiving, 'N' as a number of concurrent users for an integration test project. The integration test project comprises a plurality of integration tests associated with the software code. The program comprises a program code for simulating a multi-user test environment. The program code for simulating the multi-user test environment further comprises the program code for locating a target assembly associated with the integration test project. The program code for simulating the multi-user test environment further comprises the program code for generating an executing assembly by using the plurality of integration tests from the target assembly and the program code for dissociating the target assembly from the executing assembly such that the target assembly is prevented from locking. The program code for simulating the multi-user test environment further comprises the program code for concurrently executing the plurality of integration tests N number of times in the simulated multi-user test environment, by using the executing assembly and a parallel task library, to obtain an outcome of each of the plurality of the integration tests.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Complete Description of Embodiments

According to an embodiment, a system for executing a plurality of integration tests for testing software code is disclosed. More particularly, the system for executing the plurality of integration tests for testing software code in a multiuser environment is disclosed. The system facilitates use of integration tests written by developers during development phase. By way of execution of the integration tests, the system captures behavior of the software code in a multi-user environment. By using the system, integration tests written by developers can be executed in a multi-user environment. The system executes the plurality of integration test cases in order to capture general code performance under expected load and a stress test scenario which is difficult to reproduce. The system executes the plurality of integration test cases in a multi-user environment concurrently to resolve database locking and deadlock issues. Further, the system enables testing of thread unsafe static class usages, and resolves database connection pooling issues.

Figure 1:
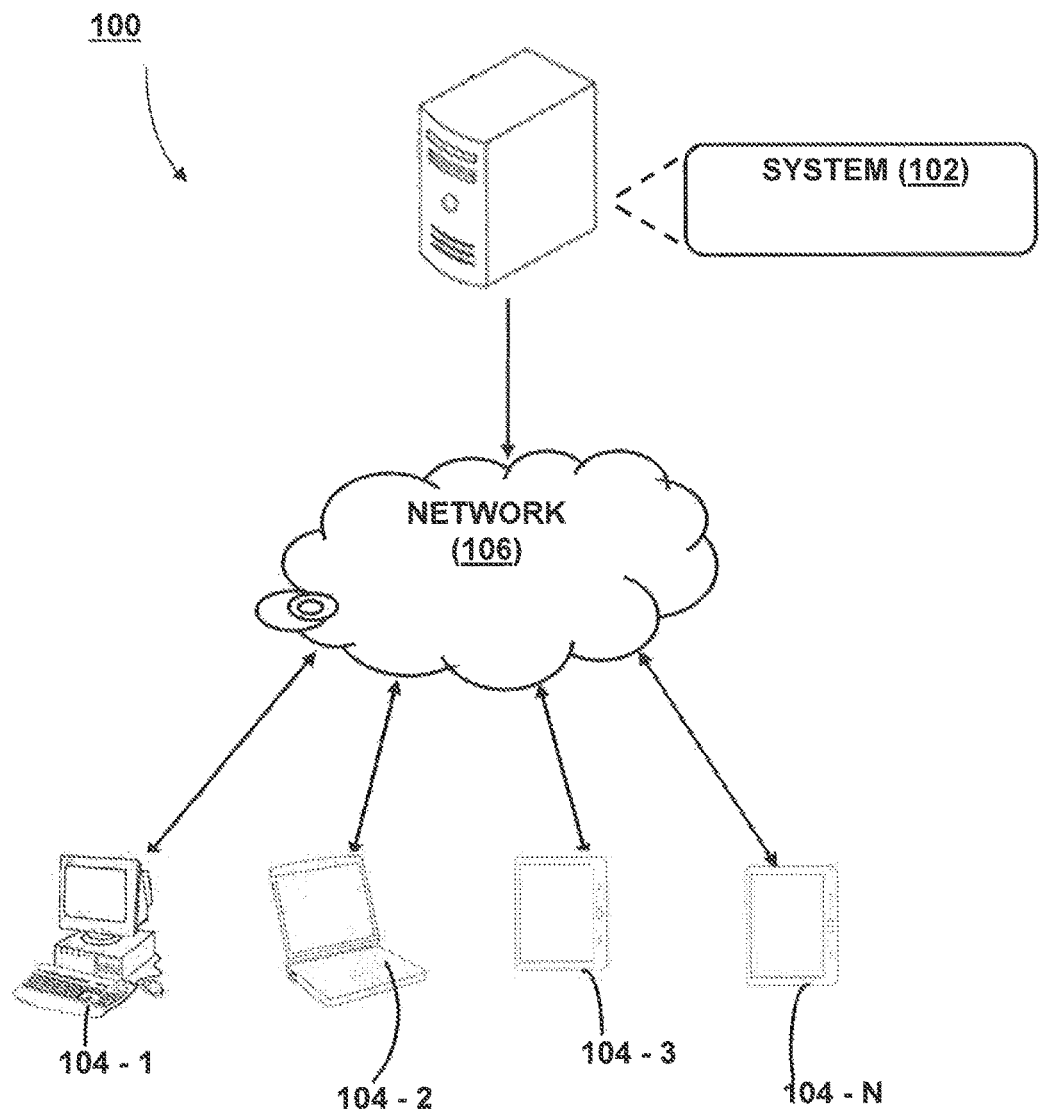
FIG. 1 illustrates a network implementation of a system for executing a plurality of integration tests for testing software code, according to some embodiments of the present disclosure.
Figure 2:
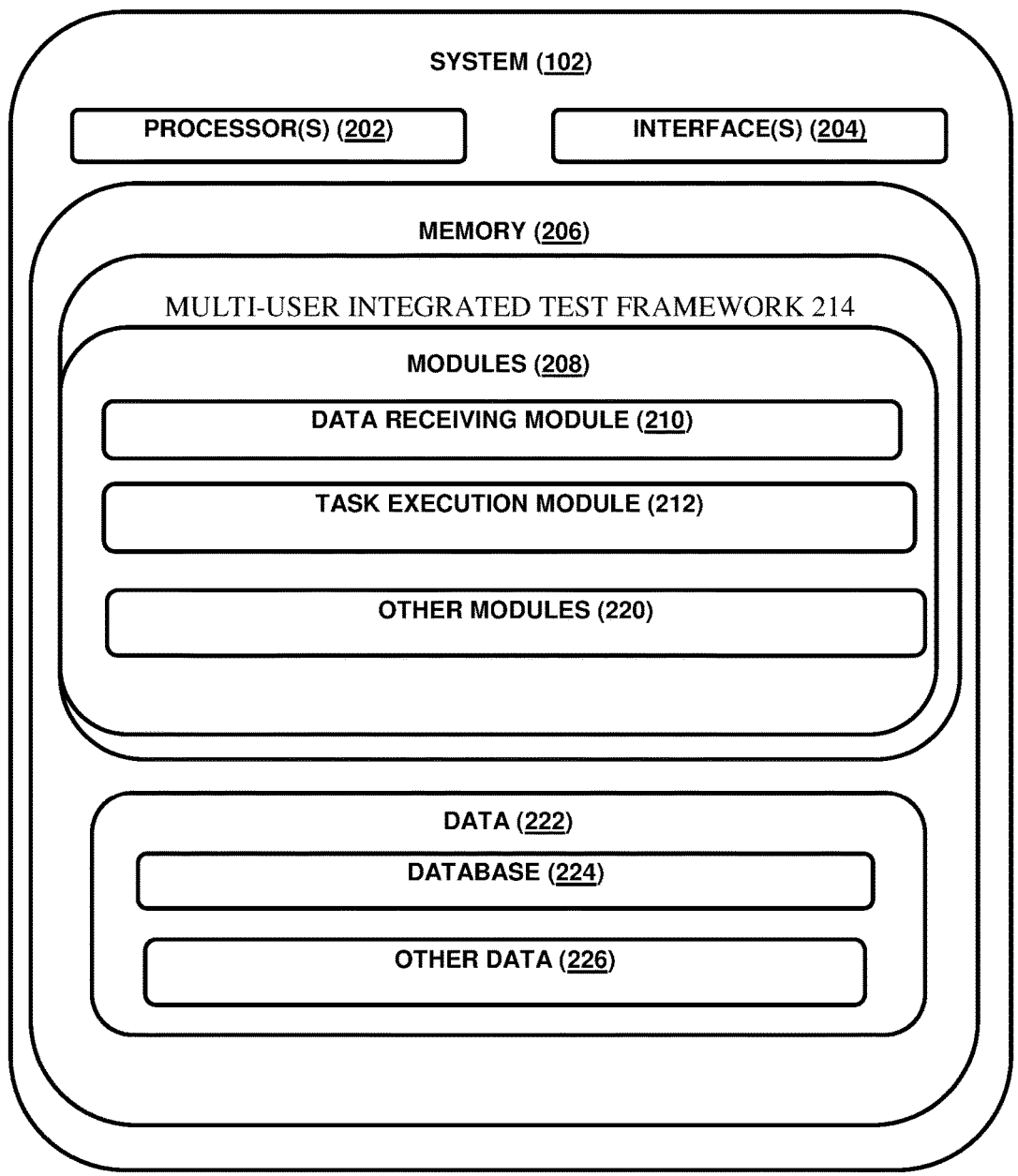
FIG. 2 is a functional block diagram of a system for executing a plurality of integration tests for testing software code, according to some embodiments of the present disclosure.

According to an embodiment, referring to FIG. 1 and FIG. 2, the system and method for executing a plurality of integration tests for testing software code, is described. There are shown preferred embodiments and these embodiments are described in the context of the following exemplary system and/or method.

Referring to FIG. 1, a network implementation 100 of a system 102 for executing a plurality of integration tests for testing software code is illustrated, in accordance with an embodiment of the present subject matter. In one embodiment, the system 102 facilitates concurrent execution of the plurality of integration tests for testing software code in a multi-user test environment. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222. The data 222, amongst other things, serves as a repository for storing data processed, received, and generated by one or more of the modules 208. The data 222 may also include database 224, and other data 226.

According to an embodiment, the system 102 for executing a plurality of integration tests for testing software code is described. The system 102 comprises the processor(s) 202 and the memory 206 coupled to the processor(s) 202. A multiuser integrated test framework 214 may be stored in the memory 204. The processor(s) 202 may execute the multi-user integrated test framework 214 stored in the memory 206 to simulate a multi-user test environment for executing a plurality of integration tests concurrently. In one example, the multi-user integrated test framework is a Visual Studio extension. The multi-user integrated test framework executes NUnit tests concurrently thereby simulating the multi-user test environment. The multi-user test environment is targeted against the integration tests written using NUnit. A user can select the number of concurrent users, and accordingly the tests are run those many times (equal to no of user times) concurrently in parallel.

The multi-user integrated test framework 214 may comprise a plurality of modules 208. The modules 208 may include routines, programs, objects, components, data structures, and the like, which perform particular tasks or implement particular abstract data types. In one implementation, the modules 208 may include a data receiving module 210, a task execution module 212 and other modules 220. The other modules 220 may include programs or coded instructions that supplement applications and functions of the system 102.

Referring now to FIG. 2, in an example illustrating execution of the plurality of integration tests for testing software code in detail implemented by the system 102, in accordance with an embodiment of the present subject matter. In order to execute the plurality of integration tests, in one embodiment, the data receiving module 210 may receive an integration test project and 'N' as a number of concurrent users for executing the integration test project. The integration test project may comprise the plurality of integration tests associated with software code. The software code may be coded in any of the software coding language such as 'C' programming, C++, Java, .Net, C#.net, ASP.net, VB, VB.net, Adv. Java, and the like. The plurality of integration tests comprises test cases generated during development stage of the software code for conducting integration testing of the software code.

According to an exemplary embodiment of the present disclosure, the system 102 is a Visual Studio 2012 extension. Alternatively, the system 102 may also be called as 'Concurrency Tester'. Visual Studio 2012 is a popular IDE (Integrated Development Environment) used by .NET developers to write and compile the software code. Upon installation of the system 102, the system can be used against any Visual Studio Project for concurrent execution of the integration tests. The intended target is an Integration Test project. Integration Test project is a class library that consumes NUnit as a testing framework. In one example, the data receiving module may comprise a Visual Studio Context menu with a combo box for receiving the integration test project and 'N' as a number of concurrent users. The combo box may collect an information about the number of concurrent users using which the integration tests may be executed in parallel. In one embodiment, the data receiving module may further comprise a .NET Assembly Information Extractor. The .NET Assembly Information Extractor may extract the assembly information of the integration test project. The assembly information may comprise a location, a name, and similar information about the integration test project. The integration test project may also be considered as a target project.

After extracting the assembly information of the integration test project, the task execution module 212 may simulate the multi-user test environment. The multi-user test environment so simulated may be further used to execute plurality of integration tests on the software code concurrently. The multi-user test environment may facilitate concurrent execution of stress tests for multiple concurrent users for the software code in an integrated development environment during development stage of the software code, which further enable the developers to test the software code in development stage. This helps to fix the defects in the software code far before final stage of SDLC and considerably saves the time and cost required to fix the defects in the software code. In order to simulate the multi-user test environment, the task execution module 212 may locate a target assembly associated with the integration test project. The target assembly may comprise integration tests referencing the software code under test. After locating the target assembly, the task execution module 212 may generate an executing assembly by using the plurality of integration tests from the target assembly. After generating the executing assembly, the task execution module 212 may dissociate the target assembly from the executing assembly such that the target assembly is prevented from locking.

After dissociating the target assembly from the executing assembly, the task execution module 212 may concurrently execute the plurality of integration tests, N number of times, by using the executing assembly and a parallel task library, to obtain an outcome of each of the plurality of the integration tests. The degree of parallelism of execution of the plurality of integration tests is equal to 'N' as the number of concurrent users. The multi-user test environment may also facilitate concurrent execution of performance tests for static class usage in multiple concurrent users for the software code in an integrated development environment.

In one embodiment, the task execution module 212 may comprise a .NET Assembly Processor for extracting the integration tests from the target assembly. The .NET Assembly Processor may extract all NUnit tests (integration tests) from the target assembly using parallel tasks, and run the NUnit tests in parallel. In one example, the .NET Assembly Processor may use .NET Reflection Based Assembly Information Extraction Process to extract the NUnit tests (integration tests) from the target assembly. Further, the .NET Assembly Processor may use C# Parallel Task Library for executing the NUnit tests in parallel for N number of times concurrently. The task execution module 212 may further comprise a .NET Assembly Sandboxer. The .NET Assembly Sandboxer may be used to isolate the target assembly from executing assembly so that target assembly is not locked. The task execution module 212 may further comprise a Visual Studio Output Window Log Writer to log the progress, results in the Output window of Visual Studio. The Visual Studio Output Window Log Writer uses a Visual Studio Extension technique to log the progress, results in the Output window of Visual Studio.

According to an exemplary embodiment, a working example of executing the plurality of integration tests for testing the software code is illustrated. Consider following case study to clarify the execution of the integration tests for testing the software code to identify bugs in multi-user scenario. Consider an example of a fictitious business function provided below.

```
public class TopSecretBusinessFunction
{ static int commission = 3;
  public float TransferMoney(float amount)
  {
      commission --;
      return Convert.ToInt16(amount) / commission;
  }
}
```

The integration tests to test above shown business function is illustrated below.

```
[TestFixture]
public class BusinessLayerIntegrationTest
{
[Test]
public void WhenMoneyIsTransferredExpectNoExceptionIsThrown( )
{
// Arrange
var topSecretBusinessFunction = new TopSecretBusinessFunction( );
// Act
TestDelegate td = ( ) => topSecretBusinessFunction.TransferMoney(5);
// Assert
Assert.DoesNotThrow(td);
}
}
```

Above shown integration test invokes the function and checks if there is no exception thrown. When above shown test is executed sequentially (i.e. in a single user environment), no matter however times, this test always pass. However, there is a subtle bug in this business function. That is only appeared in a multi-user test environment. When the same test is executed using the system 102 (concurrency tester) of the present disclosure, to test above shown business function using above listed test case, the test case gets executed in the multi-user test environment by the system 102 and the defect is trapped.

The defect shown by the system 102 after execution of above described integration test is described herein.

```
void WhenMoneyIsTransferredExpectNoExceptionIsThrown( )
Executing in a 10 users environment
{ErrorType = NUint.Framework.AssertionException, Error=Expected: No exception to be
thrown
But was: (Attempted to divide by zero)
at BusinessLayer.TopSecretBusinessFunction.TransferMoney(Single amount) in
d:\Mahesh\Training\WindowsApplication1\TestBusinessLayer\
at BusinessLayerIntegrationTest.BusinessLayerIntegrationTest.<>c—
DisplayClass1.<whenMoneyIsTransferredExpectNoExceptionIsThrown>b---
at NUint.Framework.Constraints.VoidInvocationDescriptor.Invoke( )
at NUnit.Framework.Constraints.ExceptionInterceptor.Intercept (Object invocation),
ErrorCount = 1}
```

Another example of execution of an integration test case using the system 102 in a multiuser test environment to catch the defect. Consider a following fictitious business function.

```
public class TopSecretBusinessFunction
{
static int commission = 3;
public float TransferMoney(float amount)
{
commission --;
```

```
-continued return Convert.ToInt16(amount) / commission;
}
}
```

And this function has got following integration test.

```
[TestFixture]
public class BusinessLayerIntegrationTest
{
[Test]
public void WhenMoneyIsTransferredExpectNoExceptionIsThrown( )
{
// Arrange
var topSecretBusinessFunction = new TopSecretBusinessFunction( );
// Act
TestDelegate td = ( ) => topSecretBusinessFunction.TransferMoney(5);
// Assert
Assert.DoesNotThrow(td);
}
}
```

When above shown test case is executed sequentially, no matter however times, the test case always pass. But when the same test case is executed by the system 102 (concurrency tester), the test case is executed in multi-user environment and the bug is caught.

According to an exemplary embodiment, working of the system 102 (concurrency tester) is explained. Working of the system 102 involves following main steps. Initially a context project that is integration test project is selected. Selection of the context project involves selecting the integration test project and using context menu. Next step is finding an output assembly. Finding output assembly involves locating output assembly (DLL) from selected integration test project. Further, NUnit tests from the output assembly are extracted. Extracting NUnit tests involves using reflection technique to extract test methods. After extracting test methods, a list of tasks is created. The tasks mentioned herein are C# Tasks. Further, all the test cases (test methods) are added to the list of tasks. C# Task represent an independent work to be executed. In one example, test methods are the tests written by developer in integration test project. The test methods are extracted by the system (concurrency tester). C# tasks are vehicle that carries the test method. After adding the test methods into the task list, above mentioned steps are repeated for the number of users as selected for executing the test cases (test methods). Repeating the steps for no of users comprises repeating all the steps involved such as identifying the test, creating the C# tasks, starting them in parallel. This whole exercise carried over earlier has to be repeated. In order to execute the test cases, the tasks in the task list are executed in parallel. Executing the tasks in parallel involves starting and executing all the tasks in tasks list using Task Parallel library. Further, outcome of each task (including exceptions) are collected and displayed in output window.

Figure 3:
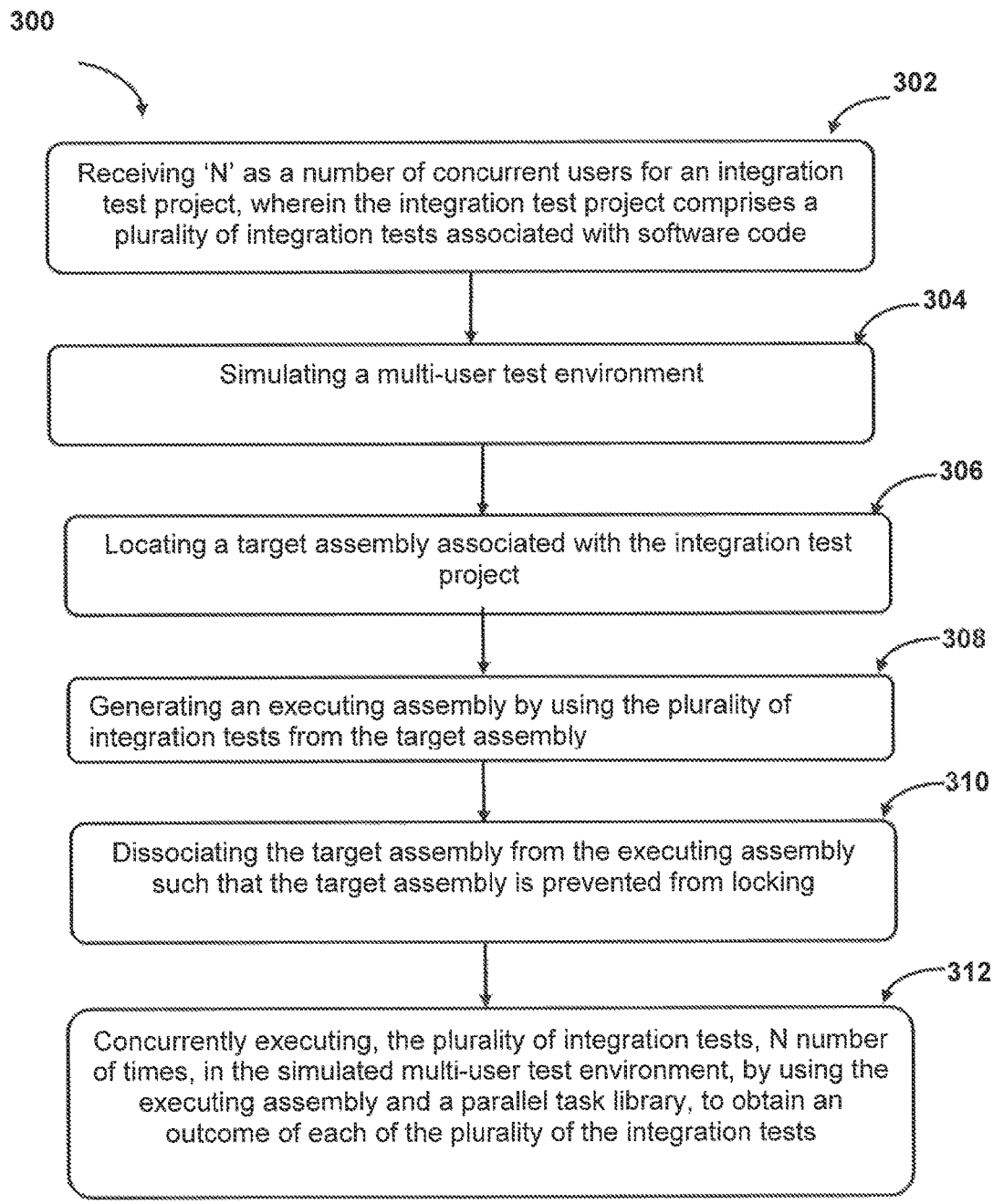
FIG. 3 is a functional block diagram of a method for executing a plurality of integration tests for testing software code, according to some embodiments of the present disclosure.

Referring now to FIG. 3, a method 300 for executing a plurality of integration tests for testing software code is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At step 302, 'N' as a number of concurrent users may be received by a processor 202 for an integration test project. The integration test project may comprise a plurality of integration tests associated with software code. In one embodiment, a data receiving module may receive 'N' as a number of concurrent users for an integration test project.

At step 304, a multi-user test environment may be simulated. In one embodiment the system 102 simulates the multi-user test environment. The multi-user test environment may facilitate concurrent execution of stress tests for multiple concurrent users for the software code in an integrated development environment during development stage of the software code. The multi-user integrated test environment may facilitate concurrent execution of performance tests for multiple concurrent users for the software code in an integrated development environment during development stage of the software code. The multi-user test environment may facilitate concurrent execution of performance tests for static class usage in multiple concurrent users for the software code in an integrated development environment.

At step 306, for simulating the multi-user test environment, a target assembly associated with the integration test project may be located by the processor 202. In one embodiment, a target assembly associated with the integration test project may be located by the task execution module 212.

At step 308, an executing assembly may be generated, by the processor 202, by using the plurality of integration tests from the target assembly. In one embodiment, the executing assembly may be generated, by the task execution module 212, by using the plurality of integration tests from the target assembly.

At step 310, the target assembly may be dissociated from the executing assembly by the processor 202, such that the target assembly is prevented from locking. In one embodiment, the target assembly may be dissociated from the executing assembly by the task execution module 212.

At step 312, the plurality of integration tests may be concurrently executed, by the processor 202, N number of times, in the simulated multi-user test environment, by using the executing assembly and a parallel task library, to obtain an outcome of each of the plurality of the integration tests. In one embodiment, the plurality of integration tests, may be concurrently executed, N number of times, by the task execution module 212, in the simulated multi-user test environment. The plurality of integration tests may comprise test cases generated during development stage of the software code for conducting integration testing of the software code.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media. It is intended that the disclosure and examples be considered as exemplary only, with a true scope and spirit of disclosed embodiments being indicated by the following claims.

The invention claimed is:

1. A method for executing a plurality of integration tests for testing software code, the method comprising:
   receiving, by a processor, 'N' as a number of concurrent users for an integration test project, wherein the integration test project comprises a plurality of integration tests associated with software code under test;

simulating a multi-user test environment comprising
locating, by the processor, a target assembly associated with the integration test project, wherein the target assembly comprises the plurality of integration tests referencing the software code under test, wherein the integration tests are 'n' unit tests;
generating, by the processor, an executing assembly by using the 'n' unit tests from the target assembly by:
extracting the 'n' unit tests from the target assembly by using a reflection technique to extract test methods, wherein the test methods are the 'n' unit tests in the integration test project, and
adding all the test methods to a list of tasks, wherein the tasks are vehicle carrying the test methods, and wherein each task from the task list represents an independent work to be executed;
dissociating, by the processor, the target assembly from the executing assembly such that the target assembly is prevented from locking; and
concurrently executing, by the processor, all the tasks from the task list, N number of times for N number of users, in the simulated multi-user test environment, by using a parallel task library, to obtain an outcome of each of the plurality of test methods, wherein the multi-user test environment facilitates the concurrent execution of the integration tests for 'N' number of concurrent users for the software code in an integrated development environment during development stage of the software code by repeatedly executing all the tasks from the task list, in parallel, for N number of times for the N number of users, and wherein a degree of parallelism of the execution of the integration tests is equal to 'N' as the number of concurrent users.

2. The method of claim 1, wherein the multi-user test environment facilitates concurrent execution of stress tests for multiple concurrent users for the software code in the integrated development environment during development stage of the software code.

3. The method of claim 1, wherein the plurality of integration tests comprises test cases generated during the development stage of the software code for conducting integration testing of the software code.

4. The method of claim 1, wherein the multi-user integrated test environment facilitates concurrent execution of performance tests for multiple concurrent users for the software code in the integrated development environment during the development stage of the software code.

5. The method of claim 1, wherein the multi-user test environment facilitates concurrent execution of performance tests for static class usage in multiple concurrent users for the software code in an integrated development environment.

6. A system for executing a plurality of integration tests for testing software code, the system comprising:
a processor;
a memory coupled to the processor, wherein the processor executes a multi-user integrated test framework stored in the memory to simulate a multi-user test environment for executing a plurality of integration tests concurrently, and wherein the multi-user integrated test framework comprises a plurality of modules, and wherein the plurality of modules comprises:
a data receiving module to receive 'N' as a number of concurrent users for an integration test project, wherein the integration test project comprises the plurality of integration tests associated with software code under test; and
a task execution module to:
simulate the multi-user test environment comprising locating a target assembly associated with the integration test project, wherein the target assembly comprises the plurality of integration tests referencing the software code under test, wherein the integration tests are 'n' unit tests;
generate an executing assembly by using the 'n' unit tests from the target assembly by:
extracting the 'n' unit tests from the target assembly by using a reflection technique to extract test methods, wherein the test methods are the 'n' unit tests in the integration test project,
creating a list of tasks based on the test methods, wherein the tasks are vehicles carrying the test methods, and
adding the test methods to the task list, wherein each task from the task list represents an independent work to be executed;
dissociate the target assembly from the executing assembly such that the target assembly is prevented from locking; and
concurrently execute all the tasks from the task list, N number of times, by using a parallel task library, in the simulated multi-user test environment, to obtain an outcome of each of the test methods, wherein the multi-user test environment facilitates the concurrent execution of the integration tests for 'N' number of concurrent users for the software code in an integrated development environment during development stage of the software code by repeatedly executing all the tasks from the task list, in parallel, for N number of times for the N number of users, wherein a degree of parallelism of the execution of the integration tests is equal to 'N' as the number of concurrent users.

7. The system of claim 6, the multi-user integrated test framework is used as an extension to an integrated development environment.

8. The system of claim 6, wherein the multi-user test environment facilitates concurrent execution of performance tests for static class usage in multiple concurrent users for the software code in an integrated development environment.

9. A non-transitory computer readable medium embodying a program executable in a computing device for executing a plurality of integration tests for testing software code, the program comprising:
a program code for simulating a multi-user test environment comprising, the program code for receiving, 'N' as a number of concurrent users for an integration test project, wherein the integration test project comprises a plurality of integration tests associated with software code under test;
the program code for locating, a target assembly associated with the integration test project, wherein the target assembly comprises the plurality of integration tests referencing the software code under test, wherein the integration tests are 'n' unit tests;
the program code for generating, an executing assembly by using the 'n' unit tests from the target assembly by:
extracting 'n' unit tests from the target assembly by using a reflection technique to extract test methods, wherein the test methods are the 'n' unit tests in the integration test project, and
adding all the test methods to a list of tasks, wherein the tasks are vehicles carrying the test methods, and wherein each task from the task list represents an independent work to be executed;

the program code for dissociating, the target assembly from the executing assembly such that the target assembly is prevented from locking; and the program code for concurrently executing, all the tasks from the task list, N number of times, for N number of users, in the simulated multi-user test environment, by using a parallel task library, to obtain an outcome of each of the test methods, wherein the multi-user test environment facilitates the concurrent execution of the integration tests for 'N' number of concurrent users for the software code in an integrated development environment during development stage of the software code by repeatedly executing all the tasks from the task list, in parallel, for N number of times for the N number of users, wherein a degree of parallelism of the execution of the plurality of integration tests is equal to 'N' as the number of concurrent users.

\* \* \* \* \*